United States Patent
Lee et al.

(10) Patent No.: US 7,206,160 B2
(45) Date of Patent: Apr. 17, 2007

(54) METHOD AND APPARATUS OF MICRO-ACTUATOR CONTROL OF THE FLYING HEIGHT OF A READ/WRITE HEAD IN A HARD DISK DRIVE

(75) Inventors: Dong Jun Lee, Sunnyvale, CA (US); Haesung Kwon, San Jose, CA (US); Hyung Jai Lee, Cupertino, CA (US)

(73) Assignee: Samsung Electronics Co., Ldt., Suwon, Kyungki-Do (KR)

( * ) Notice: Subject to any disclaimer, the term of this patent is extended or adjusted under 35 U.S.C. 154(b) by 8 days.

(21) Appl. No.: 11/140,164

(22) Filed: May 26, 2005

(65) Prior Publication Data

US 2005/0219736 A1 Oct. 6, 2005

Related U.S. Application Data

(63) Continuation-in-part of application No. 10/757,238, filed on Jan. 13, 2004.

(51) Int. Cl.
*G11B 21/02* (2006.01)
*G11B 5/596* (2006.01)
*G11B 5/56* (2006.01)

(52) U.S. Cl. .................. 360/75; 360/78.04; 360/77.02; 360/294.4; 360/294.7

(58) Field of Classification Search ..................... None
See application file for complete search history.

(56) References Cited

U.S. PATENT DOCUMENTS

| | | | |
|---|---|---|---|
| 6,950,266 B1* | 9/2005 | McCaslin et al. | 360/75 |
| 7,042,670 B2* | 5/2006 | Feng et al. | 360/75 |
| 2004/0051992 A1* | 3/2004 | Boutaghou et al. | 360/75 |
| 2005/0088772 A1* | 4/2005 | Baumgart et al. | 360/75 |

* cited by examiner

*Primary Examiner*—Andrew L. Sniezek
(74) *Attorney, Agent, or Firm*—Earle Jennings; GSS Law Group

(57) ABSTRACT

Read-write head flying height controlled through micro-actuator assembly. Flying height controlled using DC line and ground line. Lateral position controlled using them and AC line. Micro-actuator assembly operates through three terminals coupled with these lines. Head gimbal assembly contains micro-actuator assembly mechanically coupling to slider with read-write head. Actuator arm includes at least one head gimbal assembly. Actuator arm assembly includes at least one actuator arm. Voice coil actuator includes actuator assembly. Hard disk drive containing voice coil actuator. Electrical interface circuit includes ground port, DC port, and AC port, for micro-actuator assembly. Servo controller drives micro-actuator assembly to control flying height and lateral position, preferably including electrical interface circuit. Manufacturing head gimbal assembly, actuator arm, actuator assembly, voice coil actuator, and hard disk drive, and products of these manufacturing processes.

17 Claims, 7 Drawing Sheets

METHOD AND APPARATUS OF MICRO-ACTUATOR CONTROL OF THE FLYING HEIGHT OF A READ/WRITE HEAD IN A HARD DISK DRIVE

CROSS REFERENCE TO PENDING APPLICATIONS

This application is a continuation-in-part of U.S. patent application Ser. No. 10/757,238, filed Jan. 13, 2004, which is incorporated herein by reference.

TECHNICAL FIELD

The invention relates to control of the flying height of read-write heads in a hard disk drive. In particular, to the use of a micro-actuator to control the flying height of a read-write head.

BACKGROUND OF THE INVENTION

Modern disk drives include a servo controller driving a voice coil actuator to position a read-write head near a track on a rotating disk surface. The read-write head communicates with the servo controller, providing feedback, which is used in controlling the read-write head's lateral positioning near the track. The read-write head is embedded in a slider, which floats on a thin air bearing a very short distance above the rotating disk surface.

The trend in the hard disk drive industry is to increase the areal density of the rotating disk surfaces. This is often achieved by decreasing the flying height of the read-write head above the rotating disk surface. Currently, read-write heads fly at about 10 nano-meters (nm) from the rotating disk surfaces.

There are problems with flying the read-write heads and sliders so near the rotating disk surfaces. For example, sometimes the read-write heads contact the disk surface, which tends to reduce the reliability of the data stored there, and possibly damage the read-write head as well. Contact between the read-write heads and the disk surface they access, needs to be minimized, to insure the reliability of the hard disk system as a whole.

A voice coil actuator typically includes a voice coil, which swings at least one actuator arm in response to the servo controller. Each actuator arm includes at least one head gimbal assembly typically containing a read-write head embedded in a slider. The head gimbal assembly couples through a load beam to the actuator arm in the voice coil actuator.

A hard disk drive may have one or more disks. Each of the disks may have up to two disk surfaces in use. Each disk surface in use has an associated slider, with the necessary actuator arm. Hard disk drives typically have only one voice coil actuator.

Today, the bandwidth of the servo controller feedback loop, or servo bandwidth, is typically in the range of 1.1K Hz. Extending servo bandwidth increases the sensitivity of the servo controller to drive the voice coil actuator to finer track positioning. Additionally, it decreases the time for the voice coil actuator to change track positions.

One answer to this need involves integrating a micro-actuator into each head gimbal assembly. These micro-actuators are devices typically built of piezoelectric composite materials, often including lead, zirconium, and tungsten. The piezoelectric effect generates a mechanical action through the application of electric power. The piezoelectric effect of the micro-actuator, acting through a lever between the slider and the load beam, moves the read-write head over the tracks of a rotating disk surface.

The micro-actuator is typically controlled by the servo-controller through one or two wires. Electrically stimulating the micro-actuator through the wires triggers mechanical motion due to the piezoelectric effect. The micro-actuator adds fine positioning capabilities to the voice coil actuator, which effectively extends the servo bandwidth. In the single wire approach, the servo-controller provides a DC (direct current) voltage to one of the two leads of the piezoelectric element. The other lead is tied to a shared ground. In the two wire approach, the servo-controller drives both leads of the piezoelectric element of the micro-actuator.

A problem arises when integrating micro-actuators into hard disk drives with multiple disk surfaces. Each of the micro-actuators requires its leads to be controlled by the servo-controller. These leads are coupled to wires, which must traverse the flexure to electrically couple to the leads of the micro-actuator.

The flexure constrains many components of the voice coil actuator. If the shape or area of the flexure is enlarged, changes are required to many of the components of the actuator arm assembly and possibly the entire voice coil actuator. Changing many or most of the components of an actuator arm assembly, leads to increases in development expenses, retesting and recalibrating the production processes for reliability, and inherently increases the cost of production.

The existing shape and surface area of the main flex circuit has been extensively optimized for pre-existing requirements. There is no room in the main flex circuit to run separate control wires to each micro-actuator for multiple disk surfaces. This has limited the use of micro-actuators to hard disk drives with only one active disk surface.

What is needed is a way to control the flying height, to minimize the time that the read-write heads fly close to the rotating disk surfaces they access. What is further needed, is a way to integrate micro-actuators into hard disk drive with multiple disk surfaces, using the existing surface area and shape of the flexure.

SUMMARY OF THE INVENTION

The invention controls the flying height of a read-write head in a hard disk drive through the use of a coupled micro-actuator assembly, which also controls the lateral position of the read-write head. The invention operates as follows: the flying height of the read-write head off the rotating disk surface is controlled using a Direct Current (DC) line and a ground line, both electrically coupled to the micro-actuator assembly. The lateral position of the read-write head over the rotating disk surface is controlled using these lines and an Alternating Current (AC) line.

The invention includes the micro-actuator assembly operating through three terminals coupled with the ground line, the DC line and the AC line, and supporting the method of controlling the position of the read-write head. The micro-actuator assembly may preferably employ a piezoelectric effect to position the read-write head off the rotating disk surface and/or to laterally position the read-write head over the rotating disk surface. The micro-actuator assembly further preferably includes two piezoelectric devices controlling lateral positioning and a third piezoelectric device positioning the read-write head off the rotating disk surface.

The invention includes a head gimbal assembly containing the micro-actuator assembly mechanically coupling to a slider embedded with the read-write head. The head gimbal assembly includes electrical couplings to the terminals of the micro-actuator. An actuator arm including the head gimbal assembly, as well as the actuator arm assembly including a socket on a flexure providing the DC line and the AC line to the micro-actuator assembly, are elements of the invention. A voice coil actuator containing the actuator assembly is also an element of the invention.

The invention includes an electrical interface circuit for driving a micro-actuator assembly, including a ground port, a Direct Current (DC) port, and an Alternating Current (AC) port, each of which electrically couples to the micro-actuator assembly. The ground port and the DC port are used to control positioning of the read-write head off the rotating disk surface. The AC port, with the DC port, and the ground port, is used to induce the micro-actuator assembly to laterally position the read-write head over the rotating disk surface. The electrical interface circuit may preferably include an integrated circuit providing the ground port, the DC port and the AC port. The electrical interface circuit may further preferably include ports for controlling at least one of the voice coil and the spindle motor.

The invention includes a servo controller driving the micro-actuator assembly to the flying height as well as the lateral position of the read-write head. The servo controller may preferably include the electrical interface circuit. The method of operating the invention may preferably be implemented to include a computer accessing a memory containing a program system.

The invention further includes the hard disk drive implementing the invention's method of controlling read-write head positioning. The invention includes making the head gimbal assembly, the actuator arm, the actuator arm assembly, the voice coil actuator, and the hard disk drive, as well as the products of those processes.

DETAILED DESCRIPTION

The invention controls the flying height of a read-write head in a hard disk drive through the use of a coupled micro-actuator assembly, which also controls the lateral positioning of the read-write head. The invention operates as follows: the flying height of the read-write head off the rotating disk surface is controlled using a Direct Current (DC) line and a ground line, both electrically coupled to the micro-actuator assembly. The lateral position of the read-write head over the rotating disk surface is controlled using these lines and an Alternating Current (AC) line.

Figure 1:
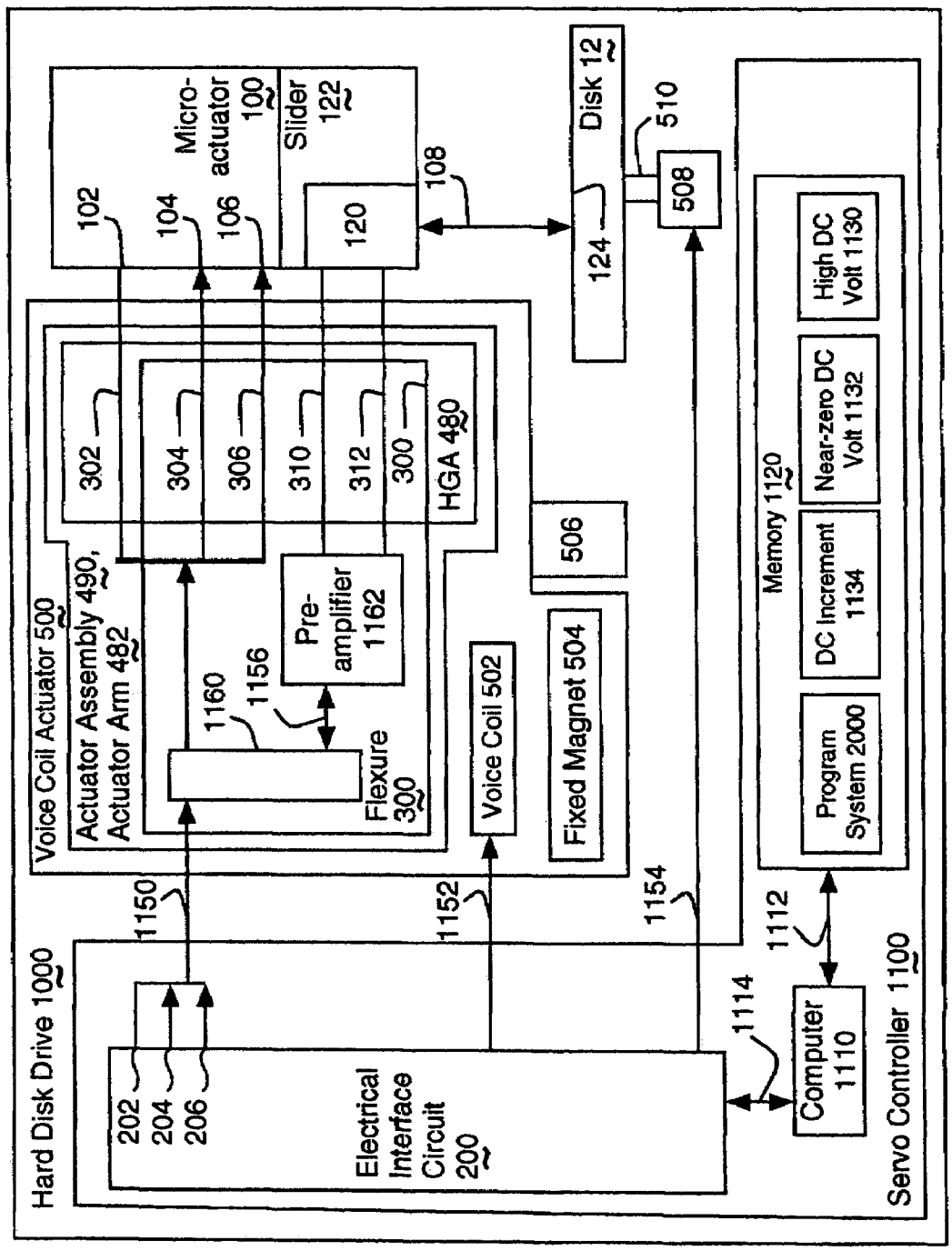
FIG. 1 shows a hard disk drive implementing the invention's method of controlling the flying height of a read-write head.
Figure 2:
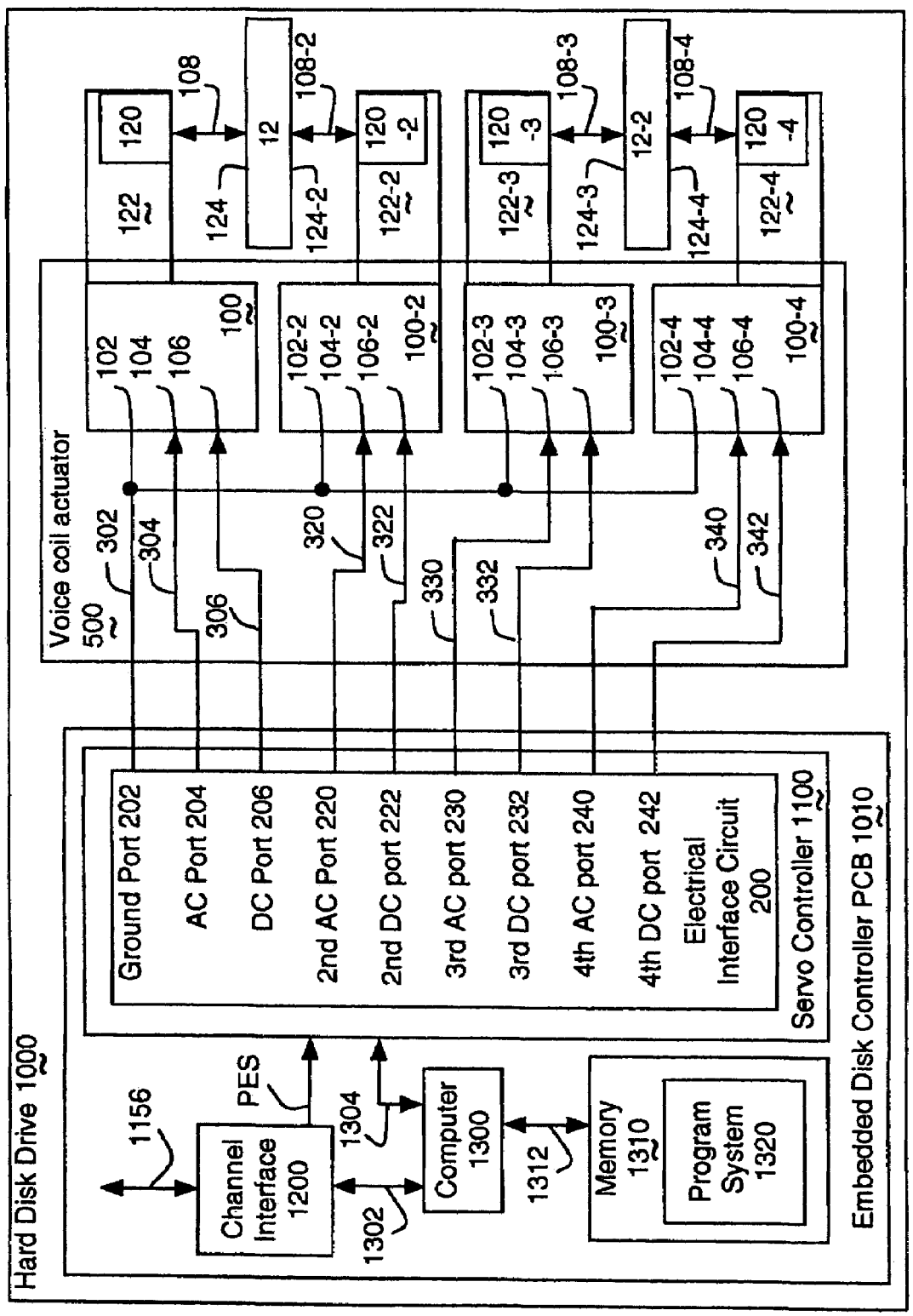
FIG. 2 shows some details of an alternative embodiment of the electrical interface circuit and the voice coil actuator of FIG. 1 controlling more than one micro-actuator assembly and through them, the flying height of more than one read-write head.
Figure 5A:
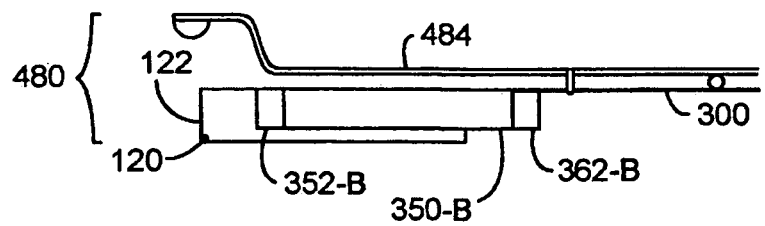
FIG. 5A shows a head gimbal assembly with the micro-actuator assembly of FIGS. 4A and 4C coupled with the slider as in FIGS. 4B and 4D.
Figure 5B:
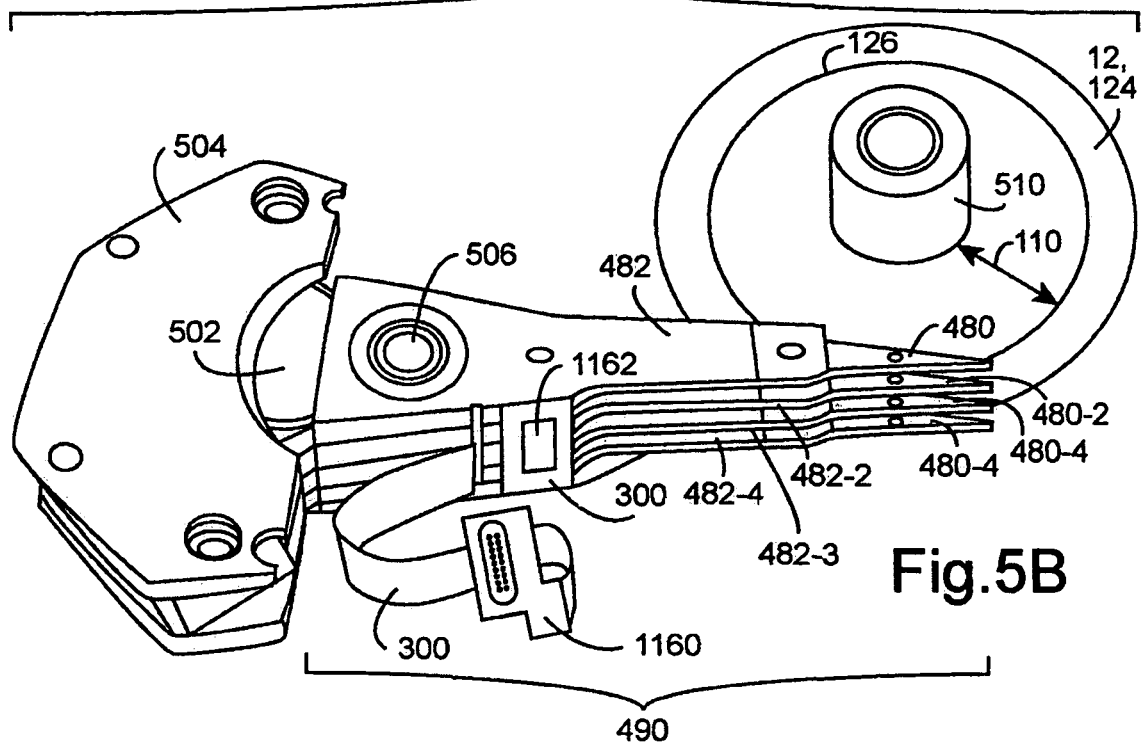
FIG. 5B shows the hard disk drive with the voice coil actuator of FIGS. 1 and 2, including the slider of FIG. 5A.

The coupled micro-actuator assembly 100 is used to control the flying height 108 of a read-write head 120 in a hard disk drive 1000, as well as the lateral position 110 of the read-write head, as shown in FIGS. 1, 2 and 5B. The DC line 306 and the ground line 302 are used to control the flying height of the read-write head off the rotating disk surface 124. The lateral position 110 of the read-write head over the rotating disk surface is controlled using these lines and an AC line 304. All three lines are electrically coupled to the micro-actuator assembly.

Controlling the flying height 108 preferably includes the following: the micro-actuator assembly 100 is induced to position the read-write head 120 within the flying height 108 off the rotating disk surface 124 by applying a high DC voltage 1130 to the DC line 306. And, the micro-actuator assembly is induced to position the read-write head above the flying height by applying a near-zero DC voltage 1132 to the DC line.

The micro-actuator assembly 100 controls the flying height 108 of the read-write head 120 off the rotating disk surface 124 as follows: the vertical micro-actuator 340 of FIGS. 3A, 4A, 4B, and 5C is excited when its two leads experience a voltage difference. These leads are electrically coupled to the first terminal 102 and the third terminal 106, which are electrically coupled to the ground line 302 and the DC line 306. The application of the high DC voltage 1130 between the ground line 302 and the DC line 306 create the potential difference the two leads of the vertical micro-actuator 340. When the vertical micro-actuator is excited, it bends, lifting the planar micro-actuator arm 350-B, as in FIG. 4E or lowering the planar micro-actuator arm 350-B as in FIG. 4F. This bending alters the flying height of the slider 122 and the read-write head.

The invention includes the micro-actuator assembly operating through three terminals coupled with the ground line, the DC line and the AC line, and supporting the method of controlling the position of the read-write head. The micro-actuator assembly may preferably employ a piezoelectric effect to position the read-write head off the rotating disk surface and/or to laterally position the read-write head over the rotating disk surface. The micro-actuator assembly further preferably includes two piezoelectric devices controlling lateral positioning and a third piezoelectric device positioning the read-write head off the rotating disk surface.

The micro-actuator assembly 100 operates through a first terminal 102 electrically coupled with the ground line 302, a second terminal 104 electrically coupled with the AC line 304, and a third terminal 106 electrically coupled with the DC line 306, as shown in FIGS. 1 to 3A. The micro-actuator assembly supports the method of controlling the position of the read-write head through electrical stimulus of the second terminal 104 and the third terminal 106.

Figure 3A:
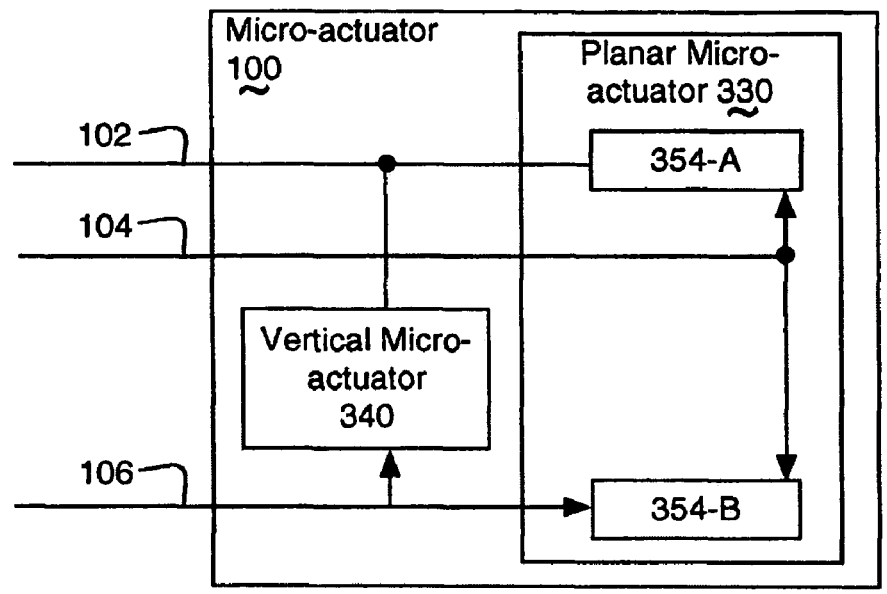
FIG. 3A shows a detail of a preferred micro-actuator assembly of FIGS. 1 and 2, including a planar micro-actuator with two planar micro-actuator arms, coupled to a vertical micro-actuator.

The micro-actuator assembly 100 preferably includes a planar micro-actuator 330, and a vertical micro-actuator 340 as shown in FIG. 3A. The micro-actuator assembly preferably includes a planar micro-actuator electrically coupled with the first terminal 102, the second terminal 104, and the third terminal 106 to control the lateral position 110 of the read-write head 120, as in FIG. 5B. The micro-actuator assembly also includes a vertical micro-actuator 340 electrically coupled to the first terminal and the third terminal to control the flying height 108 of the read-write head off the rotating disk surface 124, as in FIGS. 1 and 2. The planar micro-actuator 330 provides at least one planar micro-actuator arm 350-B for coupling 352-B to a slider 122 as shown in FIGS. 4B, 4D, 5A and 5C. Preferably, the planar micro-actuator also includes a micro-actuator arm 350-A for coupling 352-A to the slider. Preferably, the vertical micro-actuator couples 362-A with the planar micro-actuator arm 350-A and couples 362-B with the micro-actuator arm 350-B.

Figure 5C:
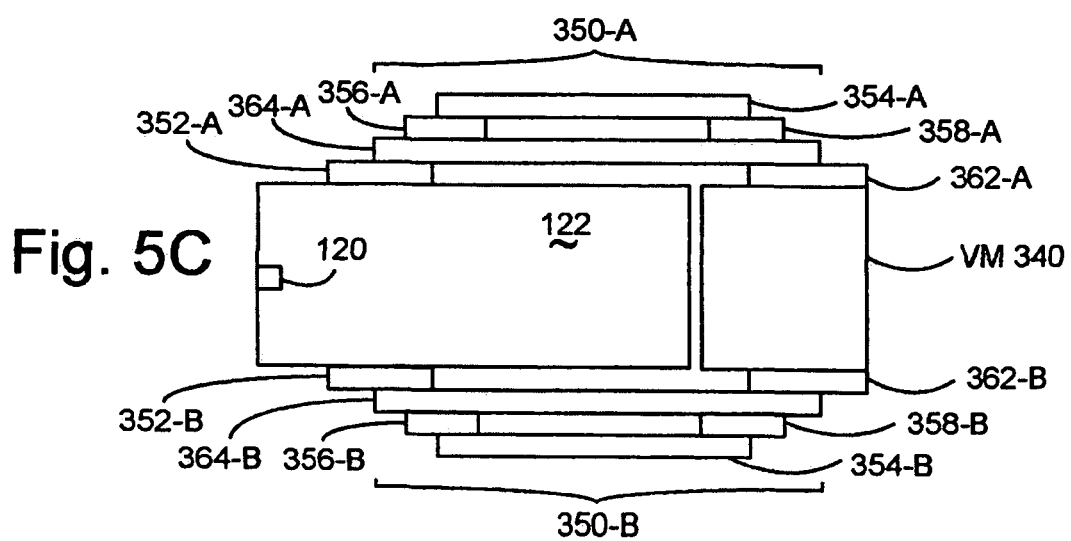
FIG. 5C shows the micro-actuator assembly coupling the slider with two micro-actuator arms as in FIG. 4B, with each micro-actuator arm including a piezoelectric device.

The micro-actuator assembly 100 may preferably employ a piezoelectric effect to position the read-write head 120 off the rotating disk surface 124 and/or to control the lateral position 110 the read-write head over the rotating disk surface. The planar micro-actuator 330 may preferably include a first piezoelectric device 354-A and a second piezoelectric device 354-B to control the lateral position, as shown in FIG. 5C. The vertical micro-actuator 340 may preferably include a third piezoelectric device 340 positioning the read-write head off the rotating disk surface.

Electrically stimulating the planar micro-actuator 330 of FIG. 3A, causes the slider 122 to move essentially perpendicular to the direction indicated in FIGS. 4C to 4F. The planar micro-actuator arms 350-A and/or 350-B support movement of the slider 122 in a planar direction as shown in FIG. 5B to affect the lateral position 110. Planar motion, as used herein, will refer to movements essentially parallel to the rotating disk surface 124. Planar motion can be simply seen as parallel to the bottom face of the slider when the rotating disk surface is essentially flat. Electrically stimulating the planar micro-actuator preferably results in the first planar micro-actuating arm contracting when the second planar micro-actuating arm expands, and/or the first planar micro-actuating arm expanding when the second planar micro-actuating arm contracts. The potential difference between the second terminal 104 and the first terminal 102 is preferably between zero volts and the potential difference between the third terminal 106 and the first terminal 102. Put another way, the voltage of the AC line 304 is preferably less than the voltage of the DC line 306, when both are measured from the ground line 302.

Figure 4A:
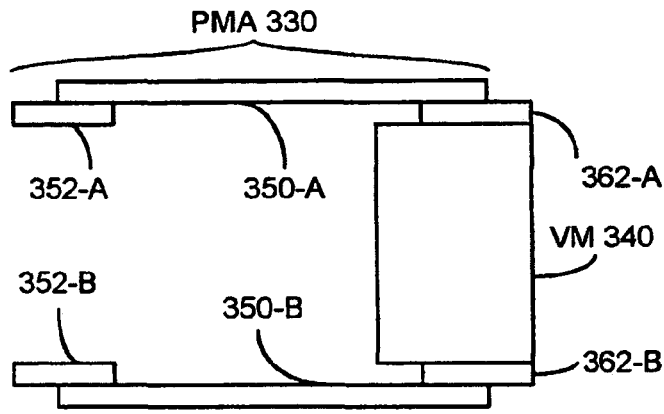
FIG. 4A shows a bottom view of the micro-actuator assembly of FIGS. 1 to 3A.
Figure 4B:
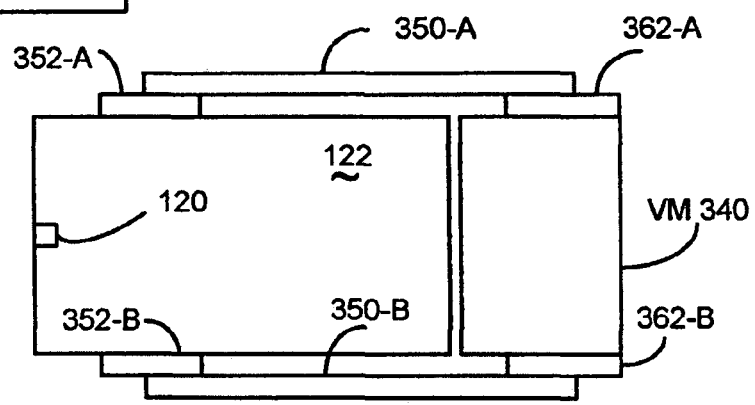
FIG. 4B shows a bottom view of the micro-actuator assembly of FIG. 4A coupling with the slider of FIG. 1.
Figure 4C:
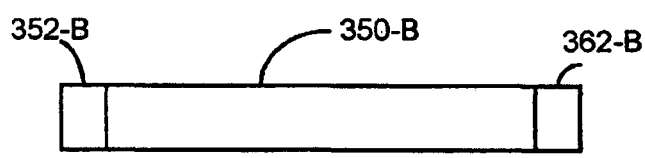
FIG. 4C shows a side view of the micro-actuator assembly of FIG. 4A.
Figure 4D:
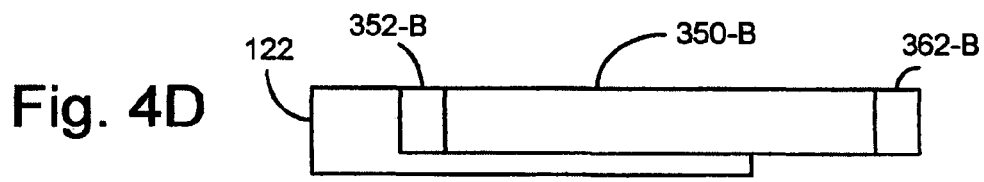
FIG. 4D shows a side view of the micro-actuator assembly of FIG. 4A coupling with the slider as in FIG. 4B.
Figure 4E:
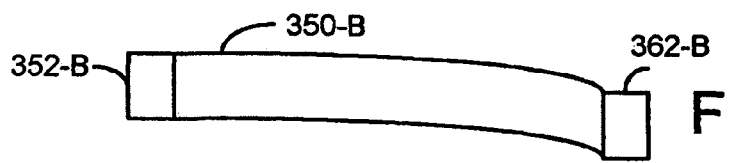
FIG. 4E shows the micro-actuator assembly of FIG. 4C moving the slider coupling in the vertical direction of up, away from a rotating disk surface.
Figure 4F:
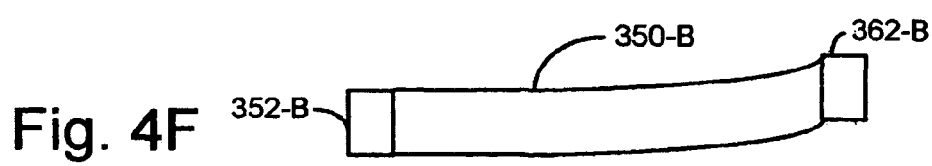
FIG. 4F shows the micro-actuator assembly of FIG. 4C moving the slider coupling in the vertical direction of down, toward the rotating disk surface.

The vertical micro-actuator 340 supports movement of the slider 122 through the micro-actuator arm(s) 350-B, and preferably, also 350-A, in a direction as shown in FIGS. 4C–4F. FIG. 4C shows the micro-actuator assembly of FIG. 4A at a rest position. FIG. 4E shows the micro-actuator assembly bending up. FIG. 4F shows the micro-actuator assembly bending down.

In simulation experiments, a potential difference of 40 volts between the two leads of the vertical micro-actuator 340, provide the coupled slider 122 with a deflection of over 5 nanometers (nm). These simulation experiments are compatible with the micro-actuator coupled with the slider as shown in FIGS. 4B, 4D, and 5C. These vertical deflections were confirmed for both the up direction of FIG. 4E and the down direction of FIG. 4F. These simulation experiments took into account the air bearing of the slider interacting with the rotating disk surface 124 of FIGS. 1 and 2.

It is preferred that the first planar micro-actuator arm 350-A and the second planar micro-actuator arm 350-B, each include a piezoelectric device. The first planar micro-actuator arm includes a first piezoelectric device 354-A, coupling with a first slider sleeve 364-A at a first coupling point 356-A and a second coupling point 358-A. These coupling points may preferably serve to provide the leads to the first piezoelectric device 354-A.

The second planar micro-actuator arm 350-B includes the second piezoelectric device 354-B, coupling with a second slider sleeve 364-B at a first coupling point 356-B and a second coupling point 358-B. These coupling points may preferably serve to provide the leads to the second piezoelectric device 354-B.

Preferably, the piezoelectric devices 354-A and/or 354-B of FIG. 5C, may further be multi-layer piezoelectric devices, which at this time appear to have the least weight for the requisite mechanical force.

One skilled in the art will recognize that the planar micro-actuator arms 350-A and/or 350-B may include, but are not limited to, other devices such as electrostatic and/or electromagnetic devices. One skilled in the art will recognize that the composition of the two micro-actuator arms may differ. Further, bulk piezoelectric devices may be included in the planar micro-actuator arms 350-A and/or 350-B.

The vertical micro-actuator 340 may include a thermoelectric device supporting the vertical slider movement.

The vertical micro-actuator 340 alters the flying height of the read-write head 120 by raising and lowering the planar micro-actuator arms as shown in FIGS. 4E and 4F. The flexure 300 electrically couples the vertical micro-actuator 340 to the ground line 302, the AC line 304 and the DC line 306 as shown in FIG. 1. The flexure 300 also couples the read-write head 120 through the read differential signal path 310 and the write differential signal path 312 to the preamplifier 1162. One skilled in the art will recognize that the exact order of these signal contacts will vary with different implementations, and any ordering is potentially preferred as the situation varies.

The invention includes a head gimbal assembly containing the micro-actuator assembly mechanically coupling to a slider embedded with the read-write head. The head gimbal assembly includes electrical couplings to the terminals of the micro-actuator. An actuator arm including the head gimbal assembly, as well as the actuator arm assembly including a socket on a flexure providing the DC line and the AC line to the micro-actuator assembly, are elements of the invention. A voice coil actuator containing the actuator assembly is also an element of the invention.

The head gimbal assembly 480 preferably includes the micro-actuator assembly 100 mechanically coupling to a slider 122 embedded with the read-write head 120, as shown in FIGS. 1 and 5A. The head gimbal assembly includes electrical couplings of the ground line 302 with the first terminal 102, the AC line 304 coupling to the second terminal 104, and the DC line 306 coupling with the third terminal 106. In the head gimbal assembly, the load beam 484 of FIG. 5A and/or the flexure 300 preferably provide the ground line 302. FIG. 1 shows the micro-actuator coupled with the slider outside of the head gimbal assembly, the actuator arm 482, the actuator arm assembly 490 and the voice coil actuator 500. This is done to simplify the Figure. In actuality, the invention contemplates the micro-actuator coupled with the slider included in each of the head gimbal assembly, the actuator arm, the actuator arm assembly and the voice coil actuator.

An actuator arm 482 preferably includes the head gimbal assembly 480 of FIGS. 1, 5A and 5B, as well as the actuator arm assembly 490 including a socket 1160 to a flexure 300 providing at least the DC line and the AC line to the micro-actuator assembly, as elements of the invention. The actuator assembly may further preferably include a preamplifier 1162 electrically coupling through a read differential signal path 310 and a write differential signal path 312 to the read-write head. A voice coil actuator 500 containing the actuator assembly, to be driven by a voice coil 502 through the actuator pivot 506 further preferably controls the lateral position of the read-write head, is also an element of the invention.

FIG. 5A shows a head gimbal assembly 480 with the micro-actuator assembly 100 of FIGS. 1A and 1C coupled with the slider 122 as in FIGS. 4B and 4D. A flexure 300 mechanically couples the micro-actuator assembly including 350-B, 352-B and 362-B with the slider. The read-write head 120 is embedded into a surface forming the bottom side of the slider.

The invention includes the voice coil actuator 500 shown in FIGS. 1, 2 and 5B built with the flexure 300 and at least one head gimbal assembly 480. The invention also includes the hard disk drive 1000 built with the voice coil actuator. The voice coil actuator includes an actuator arm assembly 490 of at least one actuator arm 482 and may, as shown, include additional actuator arms 482-2 to 482-4. A rotating disk surface 124 on a disk 12, which when the invention is in operation, rotates about a disk spindle 510. The spindle motor 508 drives the disk spindle, rotating the disk 12, and in some preferred embodiments, more than one disk, such as the second disk 12-2.

The preamplifier 1162 coupling through the read differential signal path 310 and the write differential signal path 312 to the read-write head 120, is one of the main constraints for the flexure 300. These constraints impact many of the components of the voice coil actuator 500 as shown in FIG. 5B.

The invention includes an electrical interface circuit for driving a micro-actuator-assembly, including a ground port, a Direct Current (DC) port, and an Alternating Current (AC) port, each of which electrically couples to the micro-actuator assembly. The ground port and the DC port are used to control positioning of the read-write head off the rotating disk surface. The AC port, with the DC port, and the ground port, is used to induce the micro-actuator assembly to laterally position the read-write head over the rotating disk surface. The electrical interface circuit may preferably include an integrated circuit providing the ground port, the DC port and the AC port. The electrical interface circuit may further preferably include ports for controlling at least one of the voice coil and the spindle motor.

The electrical interface circuit 200 drives 1150 the micro-actuator assembly 100, as shown in FIGS. 1 and 2. The electrical interface circuit includes a ground port 202, a DC port 206, and an AC port 204, each for electrically coupling to the micro-actuator assembly. The ground port and the DC port are used to control positioning of the read-write head 120 off the rotating disk surface 124. The AC port, with the DC port and the ground port, are used to induce the micro-actuator assembly to a lateral position 110 for the read-write head over the rotating disk surface. The electrical interface circuit may preferably include an integrated circuit providing the ground port, the DC port and the AC port. The electrical interface circuit may further preferably include at least one of a voice coil control signal 1152 for driving the voice coil 502 and a spindle motor control signal 1154 for driving the spindle motor 508.

The electrical interface circuit 200 may further include a second AC port 220, which is used to drive a second AC line 320, as shown in FIG. 2. The second AC line is used to control a second lateral position 108-2 of a second read-write head 120-2 over a second rotating disk surface 124-2. The second AC line is electrically coupled with a second micro-actuator assembly 100-2 coupled with the second read-write head in the hard disk drive 1000. In certain embodiments of the invention, the DC line 306 may be shared between two or more micro-actuator assemblies. In other, currently preferred embodiments, a second DC port 222 drives a second DC line 322 to the third terminal of the second micro-actuator assembly.

Currently, a single ground line is preferably shared by the first terminals of the micro-actuator assemblies. Only one ground port is shown in FIG. 2 as a notational convenience, one skilled in the art will recognize that there may be multiple ground ports.

The electrical interface circuit 200 may also include a port driving a voice coil control signal 1152 to the voice coil 502 as shown in FIG. 1. The voice coil control signal is a time varying signal, which induces the voice coil to interact with the fixed magnet 504 to swing the actuator assembly 490 about the actuator pivot 506 to provide crude control of the lateral position 110 of the read-write head 120 over the rotating disk surface 124.

The electrical interface circuit 200 may also include a port to drive the spindle motor control signal 1154 to the spindle motor 508. The spindle motor control signal regulates the rotational velocity of the spindle motor, acting through the spindle shaft 510 on the disk 12, and consequently at least partly controlling the rotating disk surface 124.

Figure 3B:
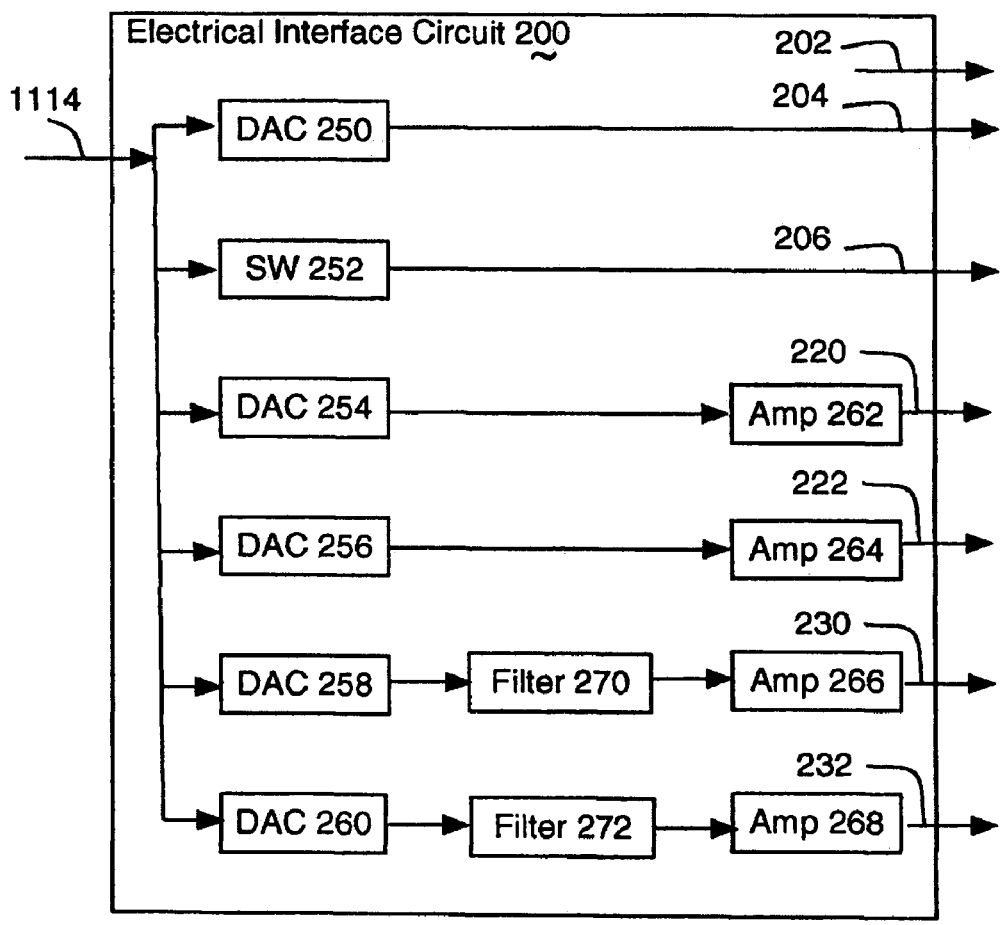
FIG. 3B shows examples of some circuitry which may be used to implement the electric interface circuit of FIGS. 1 and 2.

FIG. 3B shows examples of what is meant by at least partly driving an AC port. The electrical interface circuit 200 may include a Digital to Analog Converter (DAC) 250 to at least partly drive the AC port 204. A DAC 254 may drive an amplifier 262 to at least partly drive the second AC port 220. A DAC 258 may drive a filter 270, whose output drives an amplifier 266, which partly drive the third AC port 232. The DAC's may preferably be controlled by at least ten bits treated as a number received 1114 preferably from the computer 1110 of the servo controller 1100, as shown in FIG. 1.

FIG. 3B also shows examples of the circuitry for controlling a DC port in the electrical interface circuit 200. A switch 252 controlled 1114 by the computer 1110 may drive the DC port 206. A Digital to Analog Converter, DAC 256 may be used, often preferably amplified (Amp 264) to at least partly drive a second DC port 222. A DAC 260 may drive a filter 272, whose output drives an amplifier 268, to at least partly drive the third DC port 232. The DAC's may be controlled by at least two bits treated as a number received 1114 preferably from the computer 1110 of the servo controller 1100.

The invention includes a servo controller driving the micro-actuator assembly to the flying height as well as the lateral position of the read-write head. The servo controller may preferably include the electrical interface circuit. The method of operating the invention may preferably be implemented to include a computer accessing a memory containing a program system.

The servo controller 1100 may preferably include the electrical interface circuit 200, as shown in FIG. 1. The servo controller 1100 drives 1150 the voice coil actuator 500 to use the micro-actuator assembly 100 to position the read-write head 120 off the rotating disk surface 124 as well as control the lateral position 110 the read-write head.

The servo controller 1100 may further preferably include a computer 1110 controllably coupled 1114 with the electrical interface circuit 200. The computer is preferably accessibly coupled 1112 with a memory 1120. The memory preferably includes a program system 2000, supporting the implementation of the invention's method of controlling the flying height 108 of at least one read-write head 120 accessing a rotating disk surface 124. The memory may further include a near-zero DC voltage 1132 and a high DC voltage 1130, which are used by the computer as directed by the program system. The memory may further include a DC increment 1134.

As used herein, a memory may include volatile and/or non-volatile memory components. A non-volatile memory component retains its memory state whether or not power is available. A volatile memory component tends to lose its memory state when no power is available.

Some of the following figures show flowcharts of at least one method of the invention, possessing arrows with reference numbers. These arrows will signify of flow of control and sometimes data supporting implementations including at least one program operation or program thread executing upon a computer, inferential links in an inferential engine, state transitions in a finite state machine, and dominant learned responses within a neural network.

The operation of starting a flowchart refers to at least one of the following. Entering a subroutine in a macro instruction sequence in a computer. Entering into a deeper node of an inferential graph. Directing a state transition in a finite state machine, possibly while pushing a return state. And triggering a collection of neurons in a neural network.

The operation of termination in a flowchart refers to at least one or more of the following. The completion of those operations, which may result in a subroutine return, traversal of a higher node in an inferential graph, popping of a previously stored state in a finite state machine, return to dormancy of the firing neurons of the neural network.

A computer as used herein will include, but is not limited to an instruction processor. The instruction processor includes at least one instruction processing element and at least one data processing element, each data processing element controlled by at least one instruction processing element.

Figure 6A:
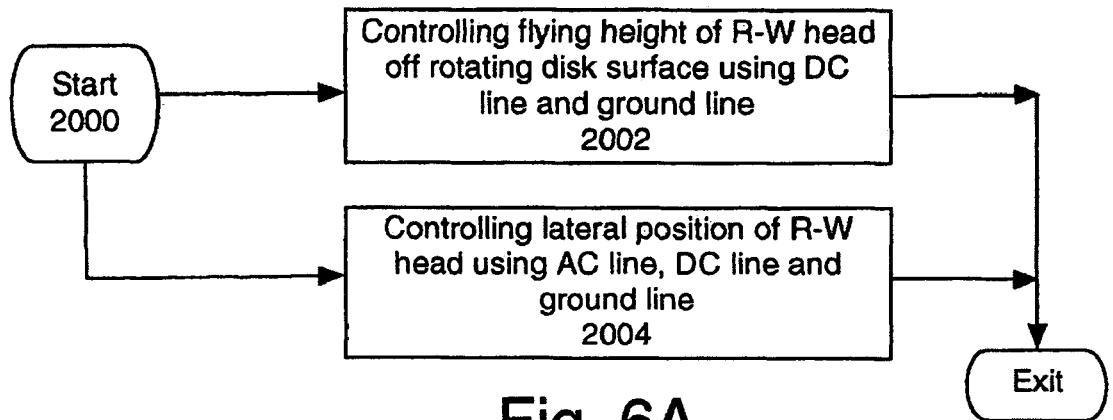
FIG. 6A to 7D shows flowcharts and details of the invention's method of operating the micro-actuator assemblies of FIGS. 1 and 2, implemented as the program system in the servo controller.

FIG. 6A shows a flowchart of the program system 2000 of FIG. 1 supporting the invention's method of controlling the flying height 108 of the read-write head 120 off the rotating disk surface 124. Operation 2002 supports controlling a flying height of the read-write head off the rotating disk surface using the DC line 306 and the ground line 302, both electrically coupled with the micro-actuator assembly 100. Operation 2004 supporting controlling the lateral position 110 of the read-write head over the rotating disk surface, using the AC line 304, the ground line and the DC line.

Figure 6B:
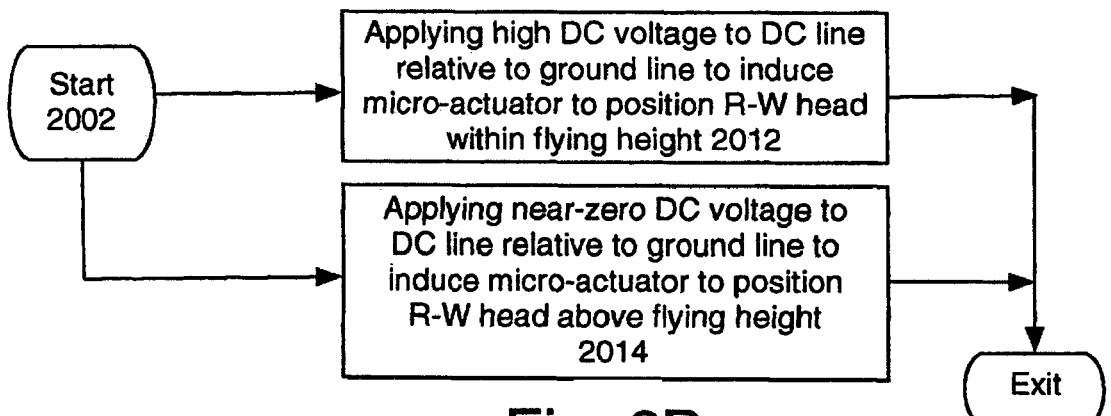

FIG. 6B shows a detail flowchart of operation 2002 of FIG. 6A. Operation 2012 supports applying the high DC voltage 1130 of FIG. 1 to the DC line 306 relative to the ground line 302 to induce the micro-actuator assembly 100 to position the read-write head 120 within the flying height 108 off the rotating disk surface 124. Operation 2014 supports applying the near-zero DC voltage 1132 to the DC line relative to the ground line to induce the micro-actuator assembly to position the read-write head above the flying height off the rotating disk surface.

The high DC voltage may preferably be between three volts and 40 volts. The high DC voltage may preferably be between five volts and twenty volts, or further, between eight volts and 16 volts. The near DC voltage may preferably be between minus two and two volts, further between minus one and one volts, and further between minus half and half a volt. In certain embodiments, the near-zero DC voltage may preferably always be non-negative.

Figure 6C:
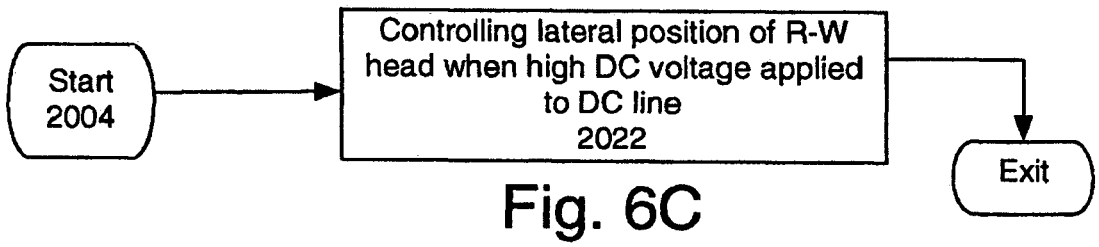

FIG. 6C shows a detail flowchart of operation 2004 of FIG. 6A. Operation 2022 supports controlling the lateral position 110 of the read-write head 120 over a track 126 on the rotating disk surface 124 of FIG. 5B, when the high DC voltage 1130 is applied to the DC line 306.

Figure 6D:
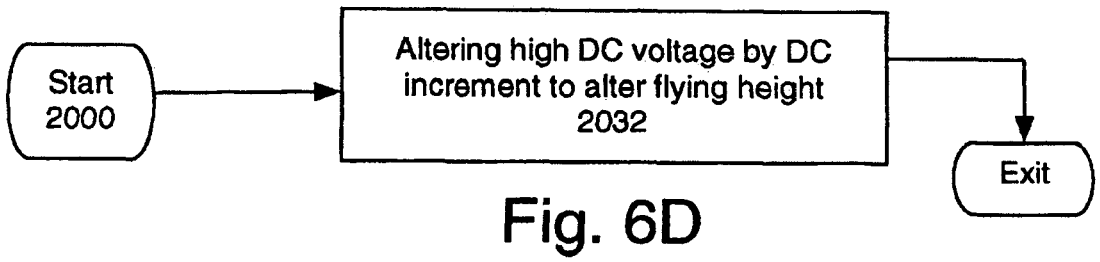

FIG. 6D shows a further detail flowchart of the program system 2000 further controlling the flying height 108 of the read-write head 120 of FIG. 1. Operation 2032 supports altering the high DC voltage 1130 by a DC increment 1134 to alter the flying height 108. The DC increment may preferably be less than half the high DC voltage 1130. The DC increment may further be less than one quarter the high DC voltage, or further, less than one eighth.

Figure 7A:
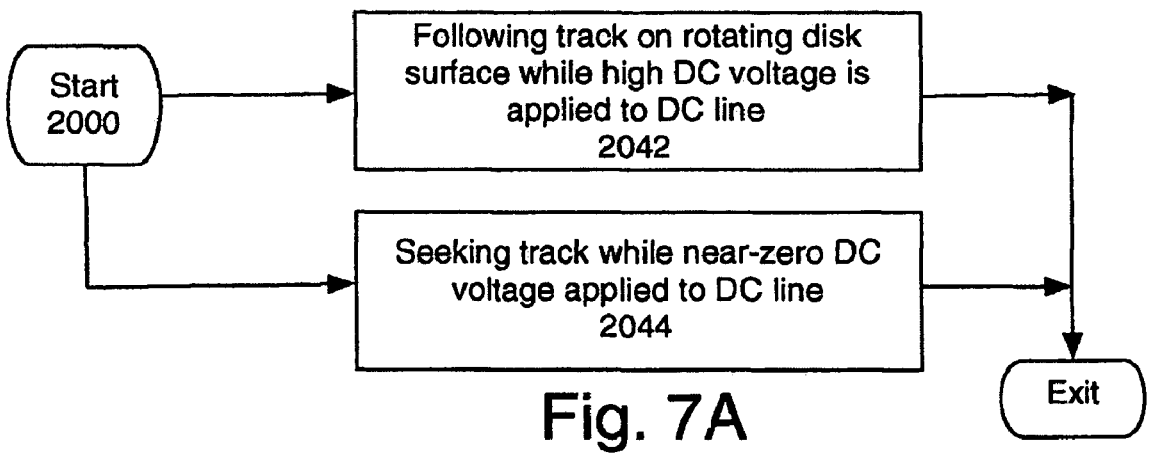

FIG. 7A shows a further detail flowchart of the program system 2000 of FIG. 1 using the control of the flying height 108 developed in FIGS. 6A to 6D. Operation 2042 supports following the track 126 on the rotating disk surface 124 while the high DC voltage 1130 is applied to the DC line 306. Operation 2044 supports seeking the track on the rotating disk surface while the near-zero DC voltage 1132 is applied to the DC line. One skilled in the art will recognize that these various implementations of these operations could assert the voltage condition of the DC line and/or post the condition required and wait for the voltage condition to be met before proceeding to follow or seek the track.

Figure 7B:
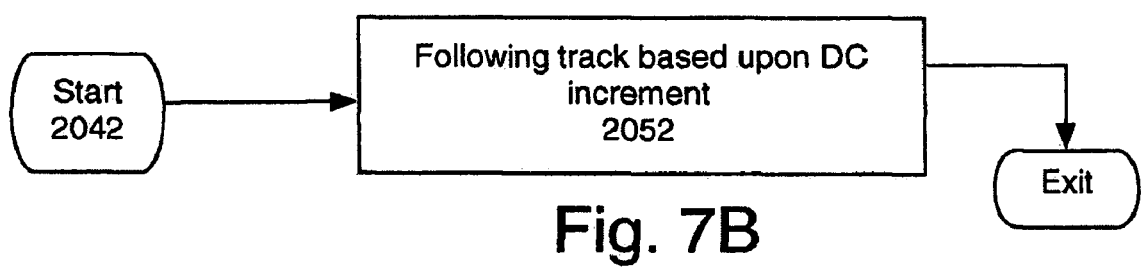

FIG. 7B shows a detail flowchart of operation 2042 of FIG. 7A. Operation 2052 supports following the track 126 on the rotating disk surface 124 based upon the DC increment 1134. Preferably, about half the DC increment may be subtracted from the AC line voltage.

Figure 7C:
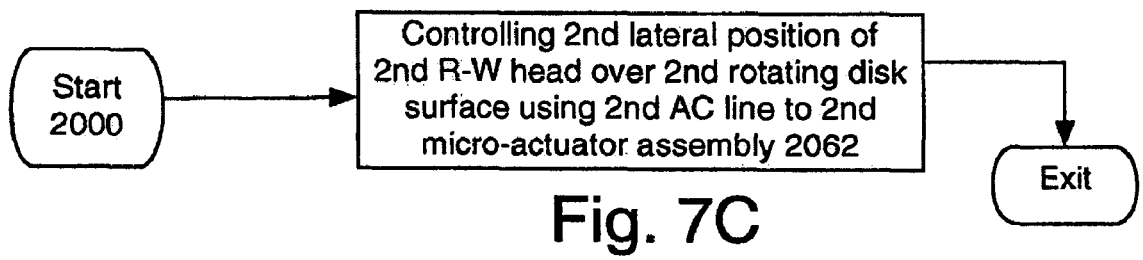

FIG. 7C shows a detail flowchart of the program system 2000 of FIG. 1 further controlling a second read-write head 120-2 off a second rotating disk surface 124-2, as shown in FIG. 2. Operation 2062 supports controlling a second of the lateral positions of the second read-write head over the second rotating disk surface using a second AC line 320 electrically coupled with a second micro-actuator assembly 100-2 coupled with the second read-write head in the hard disk drive 1000.

Figure 7D:
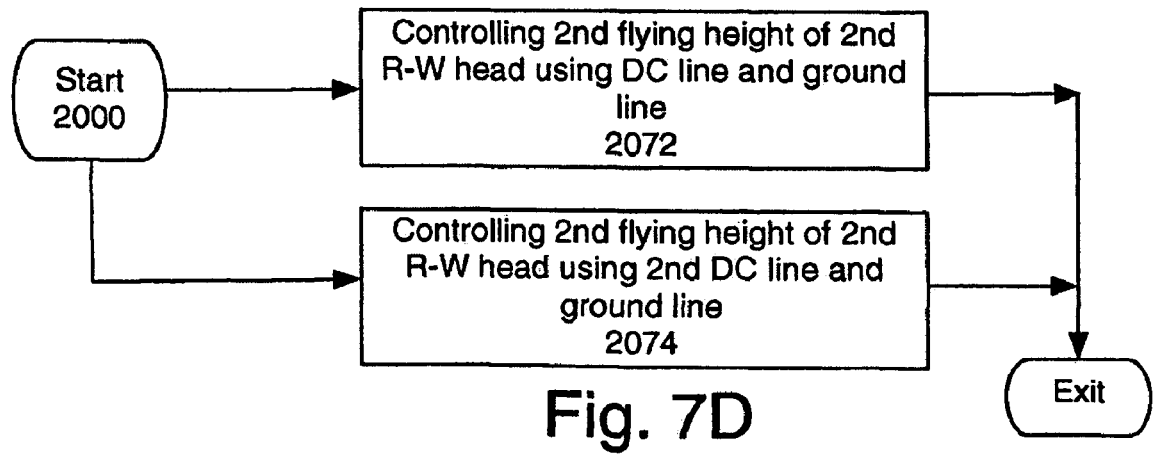

FIG. 7D shows a detail flowchart of the program system 2000 showing two alternative operations, each of which may be preferred in certain embodiments of the invention. Operation 2072 supports controlling a second flying height 108-2 of the second read-write head 120-2 off the second rotating disk surface 124-2 using the DC line 306 and the ground line 302, both electrically coupled with the second micro-actuator assembly 100-2. Operation 2074 supports controlling the second flying height 108-2 of the second read-write head 120-2 off the second rotating disk surface 124-2 using a second DC line 322 and the ground line 302, both electrically coupled with the second micro-actuator assembly.

Returning briefly to FIGS. 1 and 2, the embedded disk controller printed circuit board 1010 includes a channel interface 1200 communicatively interacting 1156 with the preamplifier 1162 through the socket 1160. The channel interface is communicatively coupled 1302 with a second computer 1300, and provides feedback signals such as a Position Error Signal (PES) to the servo controller 1100. The second computer is communicatively coupled 1304 with the servo controller and is accessibly coupled 1312 to a second memory 1310. The second memory preferably includes a second program system 1320. The invention includes embodiments where the operations of the computer of the servo-controller and the second computer may be integrated into a single integrated circuit package.

The invention further includes the hard disk drive implementing the invention's method of controlling read-write head positioning. The invention includes making the head gimbal assembly, the actuator arm, the actuator arm assembly, the voice coil actuator, and the hard disk drive, as well as the products of those processes.

When assembled the flexure 300 is electrically coupled with the preamplifier 1162 and the socket 1160, as well as passive components, which may include capacitors and resistors. These other components of the flexure may be soldered to it before, during, or after, the flexure components which extend through the actuator arms and head gimbal assemblies to the sliders.

Making the head gimbal assembly 480 of FIGS. 1, 5A and 5B includes the following steps. The micro-actuator assembly 100, at least part of the flexure 300 and a slider 122 are mechanically coupled to a load beam 484. An electrical coupling of the micro-actuator assembly includes the following: an electrical coupling of the first terminal 102 of the micro-actuator assembly to the ground line 302, the second terminal 104 to the AC line 304, the third terminal 106 to the DC line 306. An electrical coupling of the slider includes electrically coupling the read differential signal path 310 and the write differential signal path 312 to the read-write head 120 embedded in the slider. The electrical coupling of the second terminal and the third terminal typically use the flexure. The electrical coupling of the first terminal may use the load beam and/or the flexure. As used herein electrically coupling is an industrial process step often performed by bonding two or more components of low resistance. The bonding of these low resistance components is often through a form of soldering and/or welding. Mechanical coupling may further include gluing, bolting and or pinning.

Making the actuator arm 482 of FIGS. 1 and 5B preferably includes assembling the actuator arm to the head gimbal assembly 480 to provide the ground line 302, the AC line 304, the DC line 306, the read differential signal path 310 and the write differential signal path 312.

Making the actuator arm assembly 490 of FIGS. 1 and 5B preferably includes assembling the flexure 300 to at least one actuator arm 482. The assembly further preferably includes electrical coupling of a preamplifier 1162 and socket 1160 to at least the flexure 300. The preamplifier is electrically coupled to read differential signal path 310 and the write differential signal path 312 to the read-write head 120 supporting the read-write head in accessing a track 126 on the rotating disk surface 124. The socket is electrically coupled with the ground line 302, the AC line 304, and the DC line 306 to support controlling the flying height 108 of the read-write head off the rotating disk surface.

Making the voice coil actuator 500 of FIGS. 1, 2 and 5B includes the following steps. Mounting a voice coil 502 on the actuator arm assembly 490 to create a voice coil assembly. Mounting the voice coil assembly by an actuator pivot in the actuator arm assembly near at least one fixed magnet 504 to support motion induced by the voice coil and the fixed magnet, causing the actuator arm 482 to pivot about the actuator pivot to control the lateral position 110 of the read-write head 120.

Making the hard disk drive 1000 of FIGS. 1, 2, and 5B includes assembling at least one disk 12 on a disk spindle 510 to be driven by a spindle motor 508 close to the voice coil actuator 500. The assembly of the disk including positioning the disk near at least one slider 122 supporting access of the read-write head 120 during normal operation of the hard disk drive. The socket 1160 of the flexure 300 is electrically coupled to an electrical interface circuit 200, which drives the DC line 306 and the AC line 304 with respect to the ground line 302.

The invention offers the advantages of using micro-actuator assemblies for each surface of a multiple surface, hard disk drive. These micro-actuator assemblies include the ability to position within three dimensions. By not disrupting the overall design of the voice coil actuator, the invention promotes cost efficiencies. The invention further promotes reliability by allowing the use of voice coil actuator components already in production. Using the micro-actuator assemblies increases the servo bandwidth from about 1.1 K Hz to over 2.6 K Hz.

What is claimed is:

1. A method controlling a read-write head coupled with a micro-actuator assembly in a hard disk drive, comprising the steps:

controlling a flying height of said read-write head off a rotating disk surface using a Direct Current (DC) line and a ground line, both electrically coupled with said micro-actuator assembly; and controlling a lateral position of said read-write head over said rotating disk surface, using an Alternating Current (AC) line, said ground line and said DC line;

wherein the step controlling said flying height further comprises the steps:

applying a high DC voltage to said DC line relative to said ground line to induce said micro-actuator assembly to position said read-write head within said flying height off said rotating disk surface; and applying a near-zero DC voltage to said DC line relative to said ground line to induce said micro-actuator assembly to position said read-write head above said flying height off said rotating disk surface.

2. The method of claim 1, further comprising at least one of:

using a piezoelectric effect to control said lateral position; and employing another piezoelectric effect to position said read-write head flying height over said rotating disk surface.

3. The method of claim 1, wherein the step controlling said lateral position further comprises at least one of the steps:

controlling said lateral position of said read-write head over a track on said rotating disk surface when said high DC voltage is applied to said DC line;

following said track on said rotating disk surface while said high DC voltage is applied to said DC line; and seeking said track on said rotating disk surface while said near-zero DC voltage is applied to said DC line.

4. The method of claim 3, further comprising the step:

altering said high DC voltage by a DC increment to alter said flying height.

5. The method of claim 1, further comprising:
simultaneously controlling lateral positions of additional read-write heads over additional rotating disk surfaces using additional AC lines electrically coupled with additional micro-actuator assemblies; and
controlling read-write head flying heights over said additional rotating disk surfaces using DC and ground lines electrically coupled with a respective additional micro-actuator assembly.

6. A micro-actuator assembly, comprising:
means for controlling a flying height of a read-write head off a rotating disk surface using a Direct Current (DC) line and a ground line, both electrically coupled with a micro-actuator assembly, and for applying a high DC voltage to said DC line relative to said ground line to induce said micro-actuator assembly to position said read-write head within said flying height off said rotating disk surface, and for applying a near-zero DC voltage to said DC line relative to said ground line to induce said micro-actuator assembly to position said read-write head above said flying height off said rotating disk surface;
means for controlling a lateral position of said read-write head over said rotating disk surface, using an Alternating Current (AC) line, said ground line and said DC line;
a ground terminal for electrically coupling to said ground line, a DC terminal for electrically coupling to said DC line, whereby said micro-actuator assembly responds to DC voltages to change the flying height of said read-write head above said rotating disk surface; and
an AC terminal for electrically coupling to said AC line, whereby said micro-actuator assembly responds to AC voltages to laterally position said read-write head.

7. The micro-actuator assembly of claim 6, further comprising:
a planar micro-actuator electrically connected to said ground terminal, said AC terminal and said DC terminal to implement electrical control of said lateral position of said read-write head; and
a vertical micro-actuator electrically connected to said ground terminal and said DC terminal to implement electrical control of said read-write head above said rotating disk surface.

8. The micro-actuator assembly of claim 7, wherein said planar micro-actuator further comprises:
a first planar micro-actuating arm electrically connected to said ground terminal and said AC terminal to provide a first contribution to move said lateral position of said read-write head;
a second planar micro-actuating arm electrically connected to said AC terminal and said DC terminal to provide a second contribution to move said lateral position of said read-write head.

9. The micro-actuator assembly of claim 8,
wherein said first planar micro-actuating arm employs a first piezoelectric effect;
wherein said second planar micro-actuating arm employs a second piezoelectric effect; and
wherein said vertical micro-actuator employs a third piezoelectric effect.

10. The micro-actuator assembly of claim 6, further including an electrical interface circuit comprising:
a ground port electrically connected with said ground line;
a DC port electrically connected with said DC line; and
a Digital to Analog Converter (DAC) to at least partly drive an AC port connected to said AC line and thereby provides digital control of read-write head lateral positions supported by a program system and a memory.

11. The electrical interface circuit of claim 10, further comprising
one of a switch controllably coupling said DC port with one of said high DC voltage and said near-zero voltage; and
a second DAC that at least partly drives said DC port line and thereby provides digital control of read-write head flying heights supported by a program system and a memory.

12. The electrical interface circuit of claim 10, further comprising:
an integrated circuit providing said ground port, said DC port, and said AC port.

13. The electrical interface circuit of claim 10, further comprising at least one of:
a voice coil responsive to a control signal for further control of said lateral position of said read-write head; and
a spindle motor responsive to a control signal for rotating a disk surface.

14. A head gimbal assembly, comprising:
a micro-actuator assembly with means for controlling a flying height of a read-write head off a rotating disk surface using a Direct Current (DC) line and a ground line, both electrically coupled with a micro-actuator assembly, and for applying a high DC voltage to said DC line relative to said ground line to induce said micro-actuator assembly to position said read-write head within said flying height off said rotating disk surface, and for applying a near-zero DC voltage to said DC line relative to said ground line to induce said micro-actuator assembly to position said read-write head above said flying height off said rotating disk surface, and further including means for controlling a lateral position of said read-write head over said rotating disk surface, using an Alternating Current (AC) line, said ground line and said DC line;
a ground terminal for electrically coupling to said ground line, a DC terminal for electrically coupling to said DC line, whereby said micro-actuator assembly responds to DC voltages to change the flying height of said read-write head above said rotating disk surface;
an AC terminal for electrically coupling to said AC line, whereby said micro-actuator assembly responds to AC voltages to laterally position said read-write head;
wherein the micro-actuator assembly is connected to a slider embedded with a read-write head; and further comprising:
said ground line is electrically connected to said ground terminal; said AC line is electrically connected to said AC terminal; and
said DC line is electrically connected to said DC terminal.

15. A hard disk drive, comprising:
a micro-actuator assembly with means for controlling a flying height of a read-write head off a rotating disk surface using a Direct Current (DC) line and a ground line, both electrically coupled with a micro-actuator assembly, and for applying a high DC voltage to said DC line relative to said ground line to induce said micro-actuator assembly to position said read-write head within said flying height off said rotating disk surface, and for applying a near-zero DC voltage to said DC line relative to said ground line to induce said micro-actuator assembly to position said read-write head above said flying height off said rotating disk surface, and further including means for controlling a lateral position of said read-write head over said rotating disk surface, using an Alternating Current (AC) line, said ground line and said DC line;

a voice coil actuator; and a servo controller with a DC line output and an AC line output for respectively controlling a flying height and a lateral position of said read-write head off said rotating disk surface.

16. The hard disk drive of claim 15, wherein said servo controller is responsive to a computer memory and a program system for controlling said flying height of said read-write head off said rotating disk surface using said DC line and said ground line; and for controlling said lateral position of said read-write head over said rotating disk surface, using said AC line, said ground line and said DC line.

17. The hard disk drive of claim 16, wherein said computer controls a voice coil actuator to further control said lateral position of said read-write head.

* * * * *